(12) United States Patent
Sakamoto et al.

(10) Patent No.: US 7,998,588 B2
(45) Date of Patent: Aug. 16, 2011

(54) PROCESS FOR PRODUCING ROOM TEMPERATURE VULCANIZABLE ORGANOPOLYSILOXANE COMPOSITION AND BASE MATERIAL COATED WITH COMPOSITION OBTAINED BY THE PRODUCTION PROCESS

(75) Inventors: Takafumi Sakamoto, Annaka (JP); Tokuo Sato, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 28 days.

(21) Appl. No.: 12/558,116

(22) Filed: Sep. 11, 2009

(65) Prior Publication Data

US 2010/0069531 A1 Mar. 18, 2010

(30) Foreign Application Priority Data

Sep. 12, 2008 (JP) ................. 2008-234605

(51) Int. Cl.
*B32B 9/04* (2006.01)
*C08L 83/04* (2006.01)

(52) U.S. Cl. ........ 428/447; 524/268; 524/492; 524/588; 525/477; 528/34

(58) Field of Classification Search .......... None
See application file for complete search history.

(56) References Cited

U.S. PATENT DOCUMENTS

| | | | | |
|---|---|---|---|---|
| 4,261,758 | A | | 4/1981 | Wright et al. |
| 4,304,897 | A | * | 12/1981 | Bluestein ................ 528/20 |
| 4,528,324 | A | * | 7/1985 | Chung et al. ............. 524/863 |
| 4,618,646 | A | * | 10/1986 | Takago et al. ............ 524/783 |
| 4,785,041 | A | * | 11/1988 | Antonen et al. .......... 524/265 |
| 5,218,059 | A | | 6/1993 | Kishihara et al. |
| 5,936,033 | A | * | 8/1999 | Kimura et al. ............ 524/864 |
| 5,958,116 | A | | 9/1999 | Kishihara et al. |
| 5,990,231 | A | * | 11/1999 | DeGroot et al. ........... 524/730 |
| 6,121,368 | A | * | 9/2000 | Heying et al. ............. 524/493 |
| 6,451,437 | B1 | | 9/2002 | Amidaiji et al. |
| 7,049,385 | B2 | * | 5/2006 | Heilman et al. ........... 528/20 |
| 7,297,745 | B2 | | 11/2007 | Amidaiji et al. |
| 7,414,086 | B2 | | 8/2008 | Kimura et al. |
| 2009/0286916 | A1 | | 11/2009 | Iwasaki et al. |

FOREIGN PATENT DOCUMENTS

| | | |
|---|---|---|
| EP | 0 229 490 A2 | 7/1987 |
| JP | 56-76452 | 6/1981 |
| JP | 56-76453 | 6/1981 |
| JP | 58-13673 | 1/1983 |
| JP | 61-21158 | 1/1986 |
| JP | 62-84166 | 4/1987 |
| JP | 62-135560 | 6/1987 |
| JP | 62-297356 | 12/1987 |
| JP | 1-245057 | 9/1989 |
| JP | 2-48586 | 10/1990 |
| JP | 2-503986 | 11/1990 |
| JP | 10-316933 | 12/1998 |
| JP | 2952375 | 7/1999 |
| JP | 2001-139816 | 5/2001 |
| JP | 2001-181509 | 7/2001 |
| JP | 2006-342327 | 12/2006 |

* cited by examiner

*Primary Examiner* — Marc S Zimmer
(74) *Attorney, Agent, or Firm* — Oblon, Spivak, McClelland, Maier & Neustadt, L.L.P.

(57) ABSTRACT

A process for producing a room temperature vulcanizable organopolysiloxane composition comprising:
(A) 100 parts by weight of a diorganopolysiloxane having in one molecule at least two hydroxyl groups and/or hydrolyzable groups connecting to silicon atoms;
(B) 0.2 to 10 parts by weight of an alkylene oxide compound having silicon atoms in a molecule;
(C) 0.5 to 100 parts by weight of a silica; and
(D) 0.5 to 30 parts by weight of a silane and/or condensate of partial hydrolyzate thereof,
wherein said process comprises steps of hot-mixing component (A), component (B), and component (C) together, and subsequently mixing component (D) thereto.

13 Claims, No Drawings

PROCESS FOR PRODUCING ROOM TEMPERATURE VULCANIZABLE ORGANOPOLYSILOXANE COMPOSITION AND BASE MATERIAL COATED WITH COMPOSITION OBTAINED BY THE PRODUCTION PROCESS

CROSS-REFERENCE TO RELATED APPLICATION

This non-provisional application claims priority under 35 U.S.C. §119(a) on Patent Application No. 2008-234605 filed in Japan on Sep. 12, 2008, the entire contents of which are hereby incorporated by reference.

TECHNICAL FIELD

The present invention relates to a process for producing a room temperature vulcanizable organopolysiloxane composition which is suitable for use as a coating material, and also to a base material coated with a composition obtained by the production method. The room temperature vulcanizable organopolysiloxane composition is superior in sprayability or capable of giving a thick coating film by a single spray application, which helps shorten the coating schedule. Moreover, it gives a coating film of uniform thickness by spraying which excels in film strength, film hardness, rubbery property, water resistance, and moisture resistance. Because of these properties, it will find use as a ship's bottom paint, a paint for power station's seawater ducts, a fishnet paint (or any coating material that needs water resistance), a moisture-resistant coating material for LCD and PDP which need moisture resistance, an adhesive sealing material that fills space between an electric wire and a resin coating layer, an adhesive sealing material that fills space between a resin case of connector and an electric wire, and an adhesive seal for a compressed or decompressed chamber. It is particularly useful for application to ship's bottom, power station's seawater ducts, and fishnet because of its ability to prevent aquatic organisms from sticking to or growing on them.

BACKGROUND ART

There have been known various room temperature vulcanizable silicon rubber compositions that turn into rubbery elastic bodies at room temperature. Vulcanized rubbers obtained from room temperature vulcanizable silicone rubber compositions (abbreviated as RTV silicone rubber compositions hereinafter) are superior to other organic rubbers in weatherability, durability, heat resistance, and cold resistance, and hence they find use in various fields, particularly building construction, as an adhesive for glass to glass or glass to metal or as a sealant for concrete joints. It has recently come into general use as a coating material for buildings, plants, and water pipes (both inside and outside).

Unfortunately, the RTV silicone rubber composition is composed mainly of organopolysiloxane which easily becomes charged and attracts dust in the atmosphere. Therefore, the sealing or coating material based on it becomes markedly stained with time after curing, which deteriorates its good appearance. One way proposed so far to address this problem is by incorporation of RTV silicone rubber composition with a surface active agent having polyoxyethylene groups, sorbitan residues, disaccharide residues, or the like (JP-A 56-76452 and JP-A 56-76453). For this method to be effective, a large amount of surface active agent is necessary, and this deteriorates the adhesiveness which is important for RTV silicone rubber composition as a sealing or coating material.

Underwater structures and ships are vulnerable to attack by aquatic organisms sticking to or growing on their submerged parts. Such aquatic organisms living in sea and river include barnacle, ascidian, serpula, moule, mussel, *Bugula neritina*, green seaweed, and sea lettuce. They increase the frictional drag of ships, which leads to reduced speed and increased fuel consumption to maintain the constant speed, and it is disadvantageous for cost. Also, they deteriorate the performance of underwater structures or they even eat the base material. They also clog set nets or culture nets to kill fish.

One conventional way to protect underwater structures from attack by aquatic organisms was by their coating with an antifouling paint containing a poisonous antifouling agent such as organotin compound or cuprous oxide. It almost completely prevents aquatic organisms from sticking to or growing on underwater structures but it is not desirable from the standpoint of environment, safety, and hygiene at the time of its production and coating on account of the poisonous antifouling agent it contains. Moreover, the poisonous antifouling agent gradually dissolves from the coating film in water and eventually causes water pollution after a long period of time. Thus, antifouling paints have come to be banned.

In the meanwhile, there has been proposed a nontoxic paint composed of an RTV silicone rubber composition and liquid paraffin or petrolatum, which is free of poisonous antifouling agents and yet effective in preventing aquatic organics from sticking to or growing on underwater structures (JP-A 58-13673 and JP-A 62-84166). There has also been proposed a nontoxic antifouling paint composition which is composed of a reaction-curable silicone resin and a polar group-containing silicone resin. It produces its effect in such a way that the first component shrinks as curing proceeds, thereby allowing the second component (which is incompatible and non-reactive with the first one) to bleed out from it. In addition, the first component has a low surface tension which enhances the antifouling effect (Japanese Patent Nos. 2503986 and 2952375). Unfortunately, the foregoing nontoxic antifouling paint composition poses problems with environment, safety, and hygiene because the second component is a silicone resin which has polyoxyalkylene groups (adducts of ethylene oxide with propylene oxide) connecting to Si atoms through C—C bonds or a silicone resin having alkoxyl groups connecting to terminal Si atoms through ethylene oxide groups or propylene oxide groups.

In addition, there has been proposed a curable composition which contains organopolysiloxane (having condensation reactive functional groups at both ends of molecule) and hydrophobic silica (JP-A 2001-139816). There has also been proposed a curable composition which contains organopolysiloxane (having condensation reactive functional groups at both ends of molecule), hydrophobic silica, and hydrophilic silica (JP-A 2001-181509). These compositions are comparatively good in thixotropic properties, so that they give a thick coating film on a vertical plain by a single coating process. However, they are highly viscous and poor in sprayability. Upon dilution with a solvent, they rapidly lose their thixotropic properties and easily cause sagging, which leads to coating film poor in smoothness.

There is also proposed a blend of two kinds of silicone rubber differing in viscosity which gives a thick coating film even though it is diluted with a solvent (JP-A 10-316933). However, this blend is incorporated with only hydrophobic silica and hence does not possess low viscosity, high strength, and high thixotropic properties all at once. In addition, it does not give a smooth coating film with a glossy surface.

It is known that the thixotropic properties (or non-sagging properties) of high-viscosity materials can be greatly improved by incorporation with a non-sagging agent (such as polyether) and a proper filler. The main filler in use for general-purpose silicone sealing materials which are currently available on the market includes treated silica of dry process and colloidal calcium carbonate with surface treatment. Silica of dry process is used in combination with polyether having a molecular weight of 300 to 200,000 as a non-sagging agent (U.S. Pat. No. 4,261,758 and JP-B 2-48586). There is disclosed a combination of dry process silica (whose surface is pretreated with octamethylcyclotetrasiloxane) and a polysiloxane-polyether copolymer linked with a carboxyl group (JP-A 1-245057). There is disclosed a combination of polyether (having hydrolyzable silyl groups at both ends) and a filler (JP-A 61-21158). There is disclosed a combination of polypropylene glycol (having ketoxime groups at both ends) and fumed silica (JP-A 62-135560). There is disclosed a combination of specific silicone (modified with polyoxypropylene) and wet process silica (JP-A 2006-342327). These compositions are intended to impart non-sagging properties to high-viscosity materials, and their disclosures suggest nothing about making highly thixotropic the sprayable low-viscosity materials as proposed in the present invention.

SUMMARY OF INVENTION

It is an object of the present invention to provide a process for producing a room temperature vulcanizable organopolysiloxane composition which exhibits high thixotropic properties despite low viscosity and gives a thick coating film by a single application and imparts a cured film exhibiting high rubbery strength, surface smoothness, and good antifouling performance over a long period of time. It is another object of the present invention to provide a base material coated with the composition obtained by the production method.

In order to achieve the above objects, the present inventors carried out a series of researches which led to the finding that it is possible to obtain a room temperature vulcanizable organopolysiloxane composition which exhibits high thixotropic properties despite low viscosity and gives a thick coating film by a single application and imparts a cured film exhibiting high rubbery strength, surface smoothness, and good anti-fouling performance over a long period of time, by a process comprising steps of mixing a reactive diorganopolysiloxane having hydroxyl groups and/or hydrolyzable groups with an alkylene oxide compound containing silicon atoms in the molecule, adding a filler, and subjecting the resulting mixture to heat treatment.

The present invention is directed to a room temperature vulcanizable organopolysiloxane composition which exhibits high thixotropic properties despite low viscosity and gives a coating film which exhibits good antifouling performance over a long period of time and permits easy removal of organisms sticking thereto. High thixotropic properties are contradictory to smooth coating film or viscosity increase with time. And there has been no composition which meets both requirements although there has been a composition which meets the first requirement. It is designed for high thixotropic properties despite comparatively low viscosity. It is composed of a reactive diorganopolysiloxane having hydroxyl groups and/or hydrolyzable groups and hydrophobic silica (or together with hydrophilic silica).

As the result of their intensive studies, the present inventors found that it is possible to meet requirements for high thixotropic properties, surface smoothness of cured coating film, and viscosity stability with time, by a process including the steps of mixing a reactive diorganopolysiloxane having hydroxyl groups and/or hydrolyzable groups with an alkylene oxide compound (particularly silane-modified alkylene oxide compound and/or siloxane-modified alkylene oxide compound) containing silicon atoms in the molecule, adding a filler, and subjecting the resulting mixture to heat treatment. It was also found that this composition retains its good thixotropic properties and changes little in viscosity with time even though it is incorporated with bleed oil or solvent.

The production method according to the present invention gives a room temperature vulcanizable organopolysiloxane composition which has a low viscosity and exhibits high thixotropic properties and which yields a cured coating film excelling in rubbery strength and surface smoothness. In addition, the coating film prevents aquatic organisms from sticking to or growing on the surface of underwater structures and keeps its effect over a long period of time.

The present invention is directed to a process for producing a room temperature vulcanizable organopolysiloxane composition and a base material coated with the composition, which are defined in the following aspects.

Thus there is provided a process for producing a room temperature vulcanizable organopolysiloxane composition comprising (A) 100 parts by weight of a diorganopolysiloxane having in one molecule at least two hydroxyl groups and/or hydrolyzable groups connecting to silicon atoms, (B) 0.2 to 10 parts by weight of an alkylene oxide compound having at least one silicon atom in the molecule, (C) 0.5 to 100 parts by weight of a silica, and (D) 0.5 to 30 parts by weight of a silane and/or condensate of partial hydrolyzate thereof, wherein the process comprises hot-mixing component (A), component (B), and component (C) together, and subsequently mixing component (D) thereto.

In this case, it is preferred component (B) is at least one selected from silane-modified alkylene oxide compounds and siloxane-modified alkylene oxide compounds. They may be one selected from compounds represented by the following formulas:

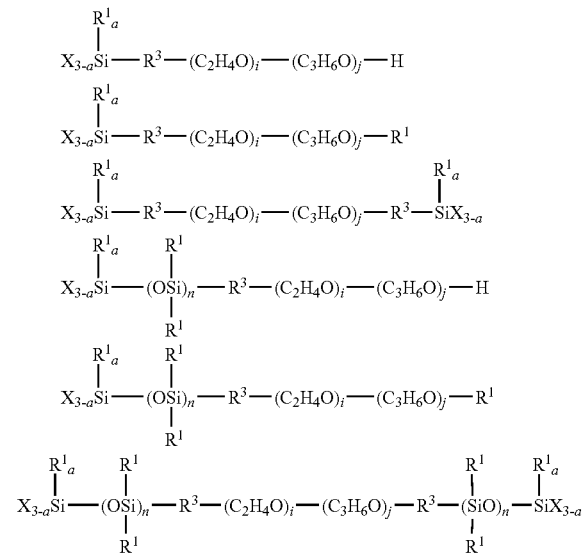

wherein $R^1$ independently denotes a substituted or unsubstituted monovalent hydrocarbon group having 1 to 6 carbon atoms, $R^3$ denotes an alkylene group having 1 to 12 carbon atoms, X independently denotes a hydrolyzable group, "a" denotes an integer of 0 to 3, n denotes an integer of 1 to 30, and i and j each denote an integer of 0 or more, with i+j being at least 3.

Preferably, component (C) is hydrophilic silica. The process may further comprises a step of adding bleed oil after hot-mixing of components (A), (B), and (C).

The present invention also provides a base material coated with a cured product of the composition obtained by the above process. The base material may be an underwater structure.

ADVANTAGEOUS EFFECT OF INVENTION

The process according to the present invention gives a room temperature vulcanizable organopolysiloxane composition which exhibits well-balanced low viscosity and high thixotropic properties and yields a thick coating film by a single application. The cured product thereof exhibits high rubbery strength and good surface smoothness. When used as a coating material, particularly a paint, the composition exhibits good sprayability which makes it possible to form a thick coating film by a single application, which leads to a reduced construction period. Also, the resulting coating film is superior in surface uniformity, film strength, and film hardness. The paint may be used as an antifouling paint which produces its effect over a long period of time. It is suitable for application to underwater structures which need protection from aquatic organisms sticking to and growing on them.

The coating film formed from the above composition is nontoxic and prevents aquatic organisms from sticking to and growing on it over a long period of time and exhibits a good antifouling effect.

DETAILED DESCRIPTION OF THE PREFERRED EMBODIMENTS

The present invention covers a process for producing a room temperature vulcanizable organopolysiloxane composition comprising (A) 100 parts by weight of a diorganopolysiloxane having in one molecule at least two hydroxyl groups and/or hydrolyzable groups connecting to silicon atoms, (B) 0.2 to 10 parts by weight of an alkylene oxide compound having silicon atoms in the molecule, (C) 0.5 to 100 parts by weight of a silica, and (D) 0.5 to 30 parts by weight of a silane and/or condensate of partial hydrolyzate thereof, wherein the process comprises steps of hot-mixing component (A), component (B), and component (C) together, and subsequently mixing component (D) to the mixture of components (A) to (C).

[Component (A)]

Component (A) is a diorganopolysiloxane, which is a base polymer of the room temperature vulcanizable organopolysiloxane composition to be produced by the process according to the present invention. It is a diorganopolysiloxane having at least two hydroxyl groups and/or hydrolyzable groups connecting to silicon atoms in the molecule. It should preferably be a diorganopolysiloxane represented by the following formula (1), with its molecular chain terminals blocked by hydroxyl groups and/or hydrolyzable groups.

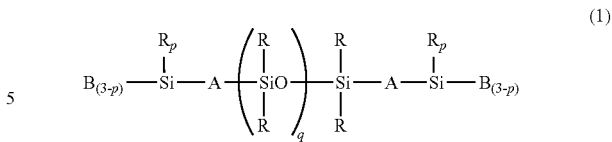

wherein R independently denotes a substituted or unsubstituted monovalent hydrocarbon group, A independently denotes an oxygen atom or a divalent hydrocarbon atom having 1 to 8 carbon atoms, B independently denotes a hydroxyl group or hydrolyzable group, p is 2 (when B represents a hydroxyl group) and 0 or 1 (when B represents a hydrolyzable group), and q is a numeral which is suitable for the diorganopolysiloxane to have a viscosity of 20 to 20,000 mPa·s at 25° C.

The group represented by R should be a monovalent hydrocarbon group having 1 to 12, preferably 1 to 10 carbon atoms. It includes alkyl groups such as methyl group, ethyl group, propyl group, butyl group, pentyl group, hexyl group, heptyl group, octyl group, nonyl group, decyl group, and octadecyl group, cycloalkyl groups such as cyclopentyl group and cyclohexyl group, alkenyl groups such as vinyl group, allyl group, butenyl group, pentenyl group, and hexenyl group, aryl groups such as phenyl group, tolyl group, xylyl group, α-naphthyl group, and β-naphthyl group, aralkyl groups such as benzyl group, 2-phenylethyl group, and 3-phenylpropyl group, and the foregoing groups whose at least one hydrogen atom is replaced by halogen atom such as F, Cl, and Br or cyano group, as exemplified by 3-chloropropyl group, 3,3,3-trifluoropropyl group, and 2-cyanoethyl group. Preferable among these groups are methyl group, vinyl group, and phenyl group, with methyl group being most desirable.

In the formula (1), A represents an oxygen atom or a divalent hydrocarbon group having 1 to 8 carbon atoms, which is exemplified by alkylene groups such as methylene group, ethylene group, propylene group, methylethylene group, butylene group, and hexamethylene group, cycloalkylene groups such as cyclohexylene group, and arylene groups such as phenylene group, tolylene group, and xylylene group. These groups may have at least one hydrogen atom therein replaced by halogen atom, or they may be composed of alkylene group and arylene group combined together. Preferably, A is an oxygen atom or ethylene group.

The organopolysiloxane may have, at its molecular chain terminal, a hydrolyzable group (B) which is exemplified by alkoxyl groups such as methoxy group, ethoxy group, and propoxy group, alkoxyalkoxyl groups such as methoxyethoxy group, ethoxyethoxy group, and methoxypropoxy group, acyloxy groups such as acetoxy group, octanoyloxy group, and benzoyloxy group, alkenyloxy groups such as vinyloxy group, isopropenyloxy group, and 1-ethyl-2-methylvinyloxy group, ketoxime group such as dimethylketoxime group, methylethylkeoxime group, and diethylketoxime group, amino groups such as dimethylamino group, diethylamino group, butylamino group, and cyclohexylamino group, aminoxy groups such as dimethylaminoxy group and diethylaminoxy group, and amide groups such as N-methylacetamide group, N-ethylacetamide group, and N-methylbenzamide group. Preferable among them are alkoxyl groups.

The organopolysiloxane as component (A) is one which has a viscosity (at 25° C.) of 20 to 20,000 mPa·s, preferably 100 to 10,000 mPa·s, more preferably 500 to 5,000 mPa·s. With an excessively low viscosity, it will result in a composition which is not suitable for coating film with good physical and mechanical strength. With an excessively high viscosity, it will result in a composition which is poor in workability due to high viscosity. Incidentally, the viscosity can be measured by using a rotational viscometer.

The organopolysiloxane as component (A) includes the following, for example.

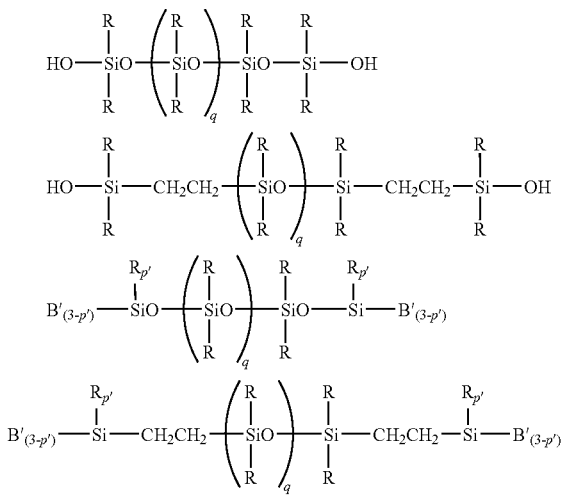

wherein R is defined as above, B' represents a hydrolyzable group, q is a numeral which is suitable for the diorganopolysiloxane to have a viscosity of 20 to 20,000 mPa·s at 25° C., and p' is 0 or 1.

The organopolysiloxanes listed above may be used alone or in combination with one another.

[Component (B)]

Component (B) is an alkylene oxide compound having at least one silicon atom in a molecule. It is composed of alkylene oxide as the main chain and additional groups, such as silane and siloxane, which contain at least one silicon atom. It is a characteristic component for the room temperature vulcanizable organopolysiloxane composition according to the present invention. It gives the composition thixotropic properties without reducing adhesiveness. The alkylene oxide compound should preferably be at least one selected from silane-modified alkylene oxide compounds and siloxane-modified alkylene oxide compounds.

The silane-modified alkylene oxide compound is composed of one molecule of alkylene oxide and at least one silane compound attached to the molecular chain terminal thereof. It has the terminal structure as shown below.

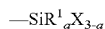

wherein $R^1$ independently denotes a substituted or unsubstituted monovalent hydrocarbon group having 1 to 6 carbon atoms, X independently denotes a hydrolyzable group, and "a" is an integer of 0 to 3, preferably 0 to 2.

The siloxane-modified alkylene oxide compound is composed of one molecule of alkylene oxide and at least one siloxane compound attached to the molecular chain terminal thereof. It has the terminal structure as shown below.

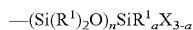

wherein $R^1$ independently denotes a substituted or unsubstituted monovalent hydrocarbon group having 1 to 6 carbon atoms, X independently denotes a hydrolyzable group, "a" is an integer of 0 to 3, preferably 0 to 2, and n is an integer of 1 to 30, preferably 1 to 20.

The group represented by $R^1$ is a substituted or unsubstituted monovalent hydrocarbon group having 1 to 6 carbon atoms, which includes alkyl groups such as methyl group, ethyl group, propyl group, butyl group, pentyl group, and hexyl group, cycloalkyl groups such as cyclopentyl group and cyclohexyl group, aryl groups such as phenyl group and tolyl group, aralkyl groups such as benzyl group and 2-phenylethyl group, alkenyl groups such as vinyl group, allyl group, butenyl group, pentenyl group, and hexenyl group, and halogenated alkyl group such as 3,3,3-trifluoropropyl group and 3-chloropropyl group. Preferable among them are methyl group and ethyl group.

The hydrolyzable group represented by X above includes those which were listed above as the hydrolyzable group at the molecular chain terminal of the diorganopolysiloxane for component (A). Preferable ones are alkoxyl groups, ketoxime groups, and isopropenoxy groups.

Typical examples include the following compounds.

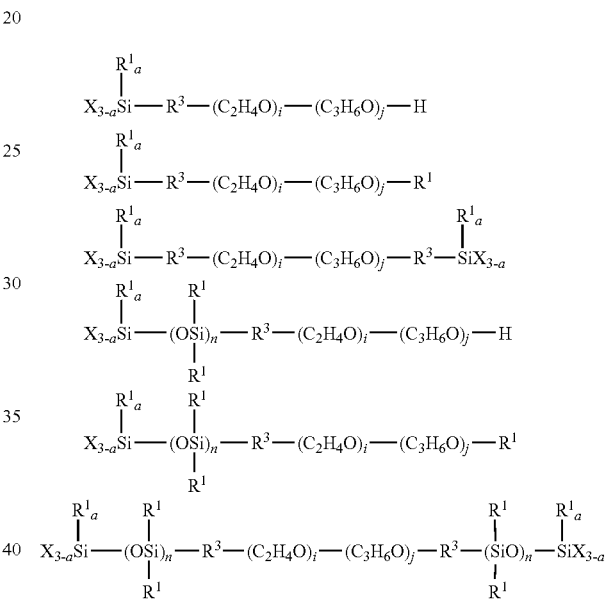

wherein $R^1$, X, a, and n are defined as above, $R^3$ denotes an alkylene group having 1 to 12 carbon atoms, and i and j each denote an integer of 0 or more, with i+j being at least 3.

$R^3$ denotes an alkylene group having 1 to 12, preferably 1 to 3 carbon atoms such as methylene group, ethylene group, propylene group, and methylethylene group; and i and j each denote an integer of 0 or more, with i+j being at least 3, preferably 3 to 100, more preferably 3 to 60.

The silane-modified alkylene oxide compound and the siloxane-modified alkylene oxide compound have the main chain of alkylene oxide which is composed of, identical or different a divalent hydrocarbon group having 2 to 3 carbon atoms such as ethylene oxide and propylene oxide as repeating units chemically bound to each other. They should preferably have a molecular weight of 200 to 10,000. With a molecular weight smaller than 200, they are economically disadvantageous because they contain the organosilicon compound in a high ratio. With a molecular weight larger than 10,000, they are too viscous to be made into the composition efficiently. With respect to viscosity, they should preferably have a viscosity of 1 to 10,000 mPa·s, more preferably 5 to 8,000 mPa·s, most preferably 10 to 6,000 mPa·s at 25° C.

The silane-modified alkylene oxide compound and the siloxane-modified alkylene oxide compound can be prepared by addition reaction of an alkylene oxide having an alkenyl group at the molecular chain terminal and a silane or siloxane compound having a hydrosilyl group in the presence of a platinum catalyst.

The alkylene oxide compound containing silicon atoms should be added in an amount of 0.2 to 10 parts by weight, preferably 0.5 to 5 parts by weight, for 100 parts by weight of component (A). An amount less than 0.2 parts by weight is not enough to produce the non-sagging effect sufficiently. An amount more than 10 parts by weight is disadvantageous in cost.

[Component (C)]

Component (C) is silica, which functions as a filler for the room temperature vulcanizable organopolysiloxane composition of the present invention. It should preferably be hydrophobic or hydrophilic silica having a BET specific surface area of at least 10 m²/g. The hydrophilic silica is more preferable. Silica includes wet-process silica such as fine silica, high-purity silica, colloidal silica, and calcium silicate, and dry-process silica such as spherical silica and fumed silica. Surface-treated silica is called hydrophilic silica, and non-surface treated silica is called hydrophobic silica of wet process or dry process. The present invention permits the hydrophilic silica and hydrophobic silica to be used alone or in combination with each other.

Silica with a BET specific surface area of less than 10 m²/g may not impart sufficient rubbery strength to the coating film of the composition.

Wet-process silica as component (C) should preferably have the following characteristic properties according to the present invention.

Adsorbed water content: about 4 to 8% by weight
Bulk density: 200 to 300 g/L
Primary particle diameter: 10 to 30 μm
BET specific surface area: at least 10 m²/g, preferably 30 to 800 m²/g, more preferably 50 to 300 m²/g Hydrophobic silica of wet-process type is prepared by surface treating wet-process silica with an organosilicon compound such as methyltrichlorosilane, dimethyldichlorosilane, hexamethyldisilazane, hexamethylcyclotrisiloxane, and octamethylcyclotetrasiloxane. It should preferably have the following characteristic properties. Little water adsorption with time. Bulk density of 200 to 300 g/L. Primary particle diameter of 1 to 30 μm. BET specific surface area of at least 10 m²/g, preferably 30 to 800 m²/g, more preferably 50 to 300 m²/g.

Dry-process silica usually have a water content of up to 1.5% by weight. The water content immediately after production is up to 0.3% by weight, but it gradually increases with time during storage and reaches about 0.5 to 1.0% by weight several months after production. The dry-process silica should preferably have a bulk density of 50 to 100 g/L although it varies depending on type, a primary particle diameter of 8 to 20 μm, and a BET specific surface area of at least 10 m²/g, preferably 20 to 400 m²/g, more preferably 30 to 300 m²/g.

Hydrophobic silica of dry-process type is prepared by surface treating dry-process silica with an organosilicon compound such as methyltrichlorosilane, dimethyldichlorosilane, hexamethyldisilazane, hexamethylcyclotrisiloxane, and octamethylcyclotetrasiloxane. It should preferably have the following characteristic properties. Little water adsorption with time. Water content of up to 0.3% by weight, mostly 0.1 to 0.2% by weight. BET specific surface area of at least 10 m²/g, preferably 30 to 400 m²/g, more preferably 50 to 300 m²/g. Primary particle diameter of 5 to 50 μm. Bulk density of 50 to 100 g/L.

In the case of hydrophobic silica of dry-process type which has undergone heat treatment together with components (A) and (B), adsorbed water on the silica surface is reduced or removed and the water content is usually up to 0.2% by weight, preferably up to 0.1% by weight, particularly 0.05 to 0.1% by weight. It is identical with hydrophobic silica of dry-process type in bulk density and other characteristic properties.

Water content is measured by heat loss method, bulk density is measured by tap density method, and primary particle diameter is measured by observation under an electron microscope.

Component (C) should be added in an amount of 0.5 to 100 parts by weight, preferably 1 to 50 parts by weight, particularly 3 to 30 parts by weight, for 100 parts by weight of component (A). Component (C) added in an amount specified above allows the paint to exhibit such good properties as film strength, film hardness, thixotropy, adequate viscosity, sprayability, and ability to form a thick coating film by a single application even on a vertical substrate. With an amount less than specified above, component (C) does not produce the above-mentioned effects. With an amount more than specified above, component (C) makes the paint so viscous as to be diluted with a solvent such as thinner before application. Such a diluted paint does not form a thick coating film by a single application.

[Component (D)]

Component (D) is a silane and/or a condensate of partial hydrolyzate thereof. It is an essential component to cure the composition of the present invention. It should have at least two hydrolyzable groups connecting to silicon atoms in one molecule. It should preferably be one which is represented by the formula (2) below.

$$R^4_b SiX_{4-b} \qquad (2)$$

wherein $R^4$ independently denotes a substituted or unsubstituted monovalent hydrocarbon group having 1 to 6 carbon atoms, X independently denotes a hydrolyzable group, and b is an integer of 0 to 2.)

The hydrolyzable group (X) may be identical with the one at the molecular chain terminal of diorganopolysiloxane as component (A). It should preferably be any of alkoxyl groups, ketoxime groups, and isopropenoxy groups.

Component (D), which is a silane and/or a condensate of partial hydrolyzate thereof, is not specifically restricted except that it should contain at least two hydrolyzable groups in the molecule as mentioned above. It should preferably contain 3 or more hydrolyzable groups. Other groups than hydrolyzable ones may connect to silicon atoms. The molecular structure may be either silane or siloxane. The siloxane structure may be linear, branched, or cyclic.

$R^4$ in formula (2) represents other groups than hydrolyzable groups. It is a substituted or unsubstituted monovalent hydrocarbon group having 1 to 6 carbon atoms, which includes alkyl groups such as methyl group, ethyl group, propyl group, butyl group, pentyl group, and hexyl group, cycloalkyl groups such as cyclopentyl group and cyclohexyl group, aryl groups such as phenyl group and tolyl group, aralkyl groups such as benzyl group and 2-phenylethyl group, alkenyl groups such as vinyl group, allyl group, butenyl group, pentenyl group, and hexenyl group, and halogenated alkyl groups such as 3,3,3-trifluoropropyl group and 3-chloropropyl group. Preferable among them are methyl group, ethyl group, phenyl group, and vinyl group.

Typical examples of the silane and/or condensate of partial hydrolyzate thereof, as component (D), include ethyl silicate, propyl silicate, methyltrimethoxysilane, methyltriethoxysilane, vinyltrimethoxysilane, vinyltriethoxysilane, methyltris (methoxyethoxy)silane, vinyltris(methoxyethoxy)silane, methyltripropenoxysilane, methyltriacetoxysilane, vinyltriacetoxysilane, methyltri(methylethylketoxime)silane, vinyltri(methylethylketoxime)silane, phenyltri(methylethylketoxime)silane, propyltri(methylethylketoxime)silane, tetra(methylethylketoxime)silane, 3,3,3-trifluoropropyltri(methylethylketoxime)silane, 3-chloropropyltri(methylethylketoxime)silane, methyltri(dimethylketoxime)silane, methyltri(diethylketoxime)silane, methyltri(methylisopropylketoxime)silane, and tri(cyclohexanoxime)silane, in the form of silane or condensate of partial hydrolyzate thereof. They may be used alone or in combination with one another.

Component (D) should be added in an amount of 0.5 to 30 parts by weight, preferably 1 to 10 parts by weight, for 100 parts by weight of component (A). An amount less than 0.5 parts by weight is not enough for complete crosslinking. An amount more than 30 parts by weight leads to an excessively hard cured product and is also disadvantageous in cost.

The room temperature vulcanizable organopolysiloxane composition according to the present invention may be used as an antifouling paint. In this case, it should preferably be incorporated with bleed oil as component (E). The bleed oil is a silicone oil whose molecule has a siloxane main chain. It is not reactive (for condensation) with diorganopolysiloxane as component (A), and it is not specifically restricted so long as it bleeds out of the cured product of the composition.

Examples of silicone oil include dimethylsilicone oil in which all organic groups are methyl groups and modified silicone oils derived from dimethylsilicone by partial substitution of methyl groups with any of the following groups.
Phenyl group (for methylphenyl silicone oil).
Monoamine, diamine, or aminopolyether group (for amino-modified silicone oil).
Epoxy, alicyclic epoxy, epoxypolyether, or epoxyaralkyl group (for epoxy-modified silicone oil).
Carbinol group (for carbinol-modified silicone oil).
Mercapto group (for mercapto-modified silicone oil).
Carboxyl group (for carboxyl-modified silicone oil).
Methacryl group (for methacryl-modified silicone oil).
Polyether group or polyether-long chain alkyl-aralkyl group (for polyether-modified silicone oil).
Long chain alkyl group or long chain alkyl-aralkyl group (for long chain alkyl-modified silicone oil).
Higher fatty acid ester group (for higher fatty acid-modified silicone oil).
Fluoroalkyl group (for fluoroalkyl-modified silicone oil).
Preferable among these examples are methylphenylsilicone oil and long chain alkyl-modified silicone oil.

Component (E) should have a number-average molecular weight of 250 to 100,000, preferably 1,000 to 60,000, in terms of polystyrene measured by gel permeation chromatography (GPC). Component (E) having a number-average molecular weight smaller than 250 does not impart good antifouling properties to the composition. Component (E) having a number-average molecular weight larger than 100,000 makes the composition poor in workability due to high viscosity.

Component (E) should have a viscosity (at 25° C.) of 20 to 30,000 mPa·s, preferably 50 to 10,000 mPa·s. Component (E) having a viscosity lower than 20 mPa·s does not impart good antifouling properties to the composition. Component (E) having a viscosity higher than 30,000 mPa·s makes the composition poor in workability due to high viscosity.

According to the present invention, the silicone oils specified above may be used alone or in combination with one another in a total amount of 10 to 300 parts by weight, preferably 20 to 200 parts by weight, for 100 parts by weight of component (A). When used in the specified amount, the silicone oil imparts good antifouling properties and film strength to the composition used as an antifouling paint. When the silicone oil is used in an amount less or more than specified above, the resulting paint is poor in antifouling properties or film strength, respectively.

[Additional Components]

The composition according to the present invention may be incorporated with a catalyst to promote curing. The curing catalyst may be selected from various ones used for room temperature vulcanizable compositions of condensation type. Typical examples are listed below.

Metal salt of organocarboxylic acid, such as lead-2-ethyl octoate, dibutyltin octoate, dibutyltin acetate, dibutyltin laurate, butyltin-2-ethyl hexoate, iron-2-ethyl hexoate, cobalt-2-ethyl hexoate, manganese-2-ethyl hexonate, zinc-2-ethyl hexonate, stannous caprylate, tin naphthenate, tin oleate, tin butanoate, titanium naphthenate, zinc naphthenate, cobalt naphthenate, and zinc stearate.

Ester of organic titanic acid, such as tetrabutyl titanate, tetra-2-ethylhexyl titanate, triethanolamine titanate, and tetra (isopropenyloxy) titanate.

Organic titanium compound and organic titanium chelate, such as organosiloxytitanium, β-carbonyltitanium, titanium diisopropoxybis(ethylacetoacetate), and titanium tetra(acetylacetonate).

Alkoxyaluminum compound.

Aminoalkyl-substituted alkoxysilane, such as 3-aminopropyltriethoxysilane and N-(trimethoxysilylpropyl)ethylenediamine.

Amine compound, such as hexylamine and dodecylamine phosphate.

Alkali metal salt of lower fatty acid, such as potassium acetate, sodium acetate, and lithium bromate.

Dialkylhydroxylamine, such as dimethylhydroxylamine and diethylhydroxylamine.

Guanidyl group-containing silane and siloxane represented by the formula below.

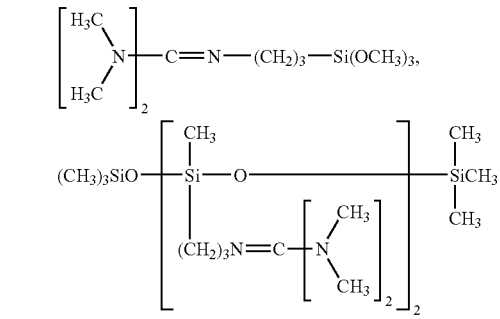

These catalysts may be used alone or in combination with one another.

The curing catalyst may be used in an effective amount. An adequate amount is usually 0.01 to 20 parts by weight, preferably 0.1 to 10 parts by weight, for 100 parts by weight of component (A). With an amount less than specified above, the catalyst does not sufficiently cure the composition although it depends on the type of crosslinking agent. With an amount more than specified above, the catalyst deteriorates the storage stability of the composition.

The composition of the present invention may optionally be incorporated with a filler for reinforcement or extension.

This filler includes, for example, quartz, diatomaceous earth, titanium oxide, aluminum oxide, lead oxide, iron oxide, carbon black, bentonite, graphite, calcium carbonate, mica, clay, glass beads, glass microballoon, shirasu balloon, glass fiber, polyvinyl chloride beads, polystyrene beads, and acrylic beads.

The amount of the filler is not specifically restricted. It is usually 1 to 50 parts by weight, preferably 5 to 30 parts by weight, for 100 parts by weight of component (A). The filler in an insufficient amount may not impart good rubbery properties to the cured product. The filler in an excess amount may make the composition poor in workability (for mixing and application) due to high viscosity.

The composition according to the present invention may optionally be incorporated with various auxiliaries such as plasticizer, colorant (pigment), flame retardant, thixotropic agent, antimicrobial agent, and adhesion promoter. Adhesion promoter is a carbon functional silane having amino groups, epoxy groups, or thiol groups, which includes γ-glycidoxypropyltrimethoxysilane and aminopropyltriethoxysilane. The amount of auxiliaries should be small enough not to hinder the object of the present invention.

[Production of Room Temperature Vulcanizable Organopolysiloxane Composition]

According to the present invention, the room temperature vulcanizable organopolysiloxane composition is produced by previously mixing together component (A), component (B), and component (C) at normal pressure or under reduced pressure with heating for 0.5 to 3 hours and subsequently adding the remaining component. An alternative and preferable way for the first step is by mixing together component (A) and component (B) at normal pressure or under reduced pressure and then adding component (C). The heating temperature is no lower than 50° C. and lower than the thermal decomposition temperature of the components, preferably from 80° C. to 300° C., particularly from 100° C. to 200° C. Mixing with the remaining component is accomplished at a temperature no higher than 80° C., preferably no higher than 50° C., and particularly at room temperature. The mixing of components (A), (B), and (C) may be accomplished by adding all or part of component (A). It is desirable to add more than half of component (A).

The heat-mixing of part or all of component (A), component (B), and component (C) gives rise to the desired composition (as coating material) which is superior in high thixotropic properties, film surface smoothness, and viscosity stability with time.

In the case where the room temperature vulcanizable organopolysiloxane composition obtained by the process of the present invention is used as an antifouling paint, it should preferably be incorporated with bleed oil as component (E). The incorporation with bleed oil should be carried out at no higher than 80° C., preferably no higher than 50° C., particularly at room temperature, after the heat treatment of components (A), (B), and (C). Bleed oil may be added together with the remaining component or before the remaining component is added.

The composition obtained as mentioned above according to the present invention may be used as a coating material or paint (especially antifouling paint) which has high thixotropic properties, good storage stability, and ability to form a thick coating film by a single application. And the resulting coating film has balanced rubbery properties (such as hardness, tensile strength, and elongation) and exhibits good antifouling performance.

The coating material according to the present invention forms a thick coating film by a single application. It should have a viscosity (at 25° C.) no higher than 200,000 mPa·s, particularly no higher than 150,000 mPa·s, which is suitable for coating.

The composition produced by the process according to the present invention will find use in the application areas listed below.

Water-resistant coating material as ship bottom paint, fishnet paint, and paint for seawater ducts in power stations.

Moisture-resistant coating materials for LCD and PDP.

Sealant between electric wire and resin coating, sealant between electric wire and resin casing or resin connector, and sealant for pressure or vacuum chambers.

Particular applications include coating on ships, harbor facilities, buoys, pipeline, bridges, underwater bases, offshore oil field drill rigs, water ducts in power stations, fish farming net, set net, and other underwater structures. After curing, the composition gives a non-toxic coating film which causes no problems with environment and prevents aquatic organisms from sticking to and growing on it and retains its good antifouling effect over a long period of time.

The composition produced by the process according to the present invention may be applied (for coating) to underwater structures in any amount without specific restrictions. An adequate amount is such that the coating film (after curing) has a thickness of 10 to 1,000 μm, particularly 50 to 500 μm. Incidentally, application and curing may be accomplished at normal (room) temperature.

EXAMPLES

The present invention will be described in more detail with reference to the following Examples and Comparative Examples, which are not intended to restrict the scope thereof. In the following examples, "parts" means "parts by weight" and the value of viscosity is one which is measured at 25° C. with a rotational viscometer and the value of specific surface area is one which is measured by BET method.

Example 1

The following two components were uniformly mixed together: 100 parts of α,ω-dihydroxy-dimethylpolysiloxane having a viscosity of 1,500 mPa·s; and 1 part of α,ω-di-(3-[methylbis[(1-methylethenyl)oxy]]silyl)propyl-poly[oxy(methyl-1,2-ethanediyl)] having a viscosity of 3,000 mPa·s. The resulting mixture was uniformly mixed with 10 parts of fumed silica having a specific surface area of 130 m$^2$/g at 150° C. for 2 hours under reduced pressure. The resulting mixture was further mixed uniformly with 10 parts of vinyltris(methylethylketoxime)silane and 1 part of 3-aminopropyltriethoxysilane under reduced pressure. Thus there was obtained the desired composition.

Example 2

The same procedure as in Example 1 was repeated to prepare the composition except that 10 parts of the fumed silica having a specific surface area of 130 m$^2$/g was replaced by 10 parts of fumed silica having a specific surface area of 110 m$^2$/g which is surface-treated with dimethyldichlorosilane.

Example 3

The same procedure as in Example 1 was repeated to prepare the composition except that 10 parts of the fumed silica having a specific surface area of 130 m$^2$/g was replaced by 5 parts of fumed silica having a specific surface area of 110 m²/g which is surface-treated with dimethyldichlorosilane and 5 parts of fumed silica having a specific surface area of 130 m²/g.

Example 4

The same procedure as in Example 1 was repeated to prepare the composition except that 10 parts of the fumed silica having a specific surface area of 130 m²/g was replaced by 10 parts of fumed silica having a specific surface area of 50 m²/g.

Example 5

The composition obtained in Example 1 was incorporated with 30 parts of α,ω-trimethylsiloxy-dimethyldiphenylpolysiloxane having a viscosity of 300 mPa·s, followed by mixing under reduced pressure to make a uniform composition.

Example 6

The same procedure as in Example 5 was repeated to prepare the composition except that the α,ω-trimethylsiloxy-dimethyldiphenylpolysiloxane having a viscosity of 300 mPa·s was replaced by α,ω-trimethylsiloxy-dimethyl-methylpolyetherpolysiloxane (HLB 4).

Example 7

The following two components were uniformly mixed together: 100 parts of α,ω-dihydroxy-dimethylpolysiloxane having a viscosity of 1,500 mPa·s; and 1 part of α,ω-di-(3-[methylbis[(1-methylethenyl)oxy]]silyl)propyl-poly[oxy(methyl-1,2-ethanediyl)] having a viscosity of 3,000 mPa·s. The resulting mixture was uniformly mixed with 10 parts of fumed silica having a specific surface area of 130 m²/g at 150° C. for 2 hours under reduced pressure. The resulting mixture was further mixed uniformly with the following three components under reduced pressure: 8 parts of vinyltris(isopropenoxy)silane; 1 part of 1,1,3,3-tetramethyl-2-[3-(trimethylsilyl)propyl]guanidine; and 1 part of 3-aminopropyltriethoxysilane. Thus there was obtained the desired composition.

Example 8

The following two components were uniformly mixed together: 100 parts of α,ω-trimethoxysilylethyl-dimethylpolysiloxane having a viscosity of 5,000 mPa·s; and 1 part of α,ω-di-(3-[methylbis[(1-methylethenyl)oxy]]silyl)-propyl-poly[oxy(methyl-1,2-ethanediyl)] having a viscosity of 3,000 mPa·s. The resulting mixture was uniformly mixed with 10 parts of fumed silica having a specific surface area of 130 m²/g at 150° C. for 2 hours under reduced pressure. The resulting mixture was further mixed uniformly with the following three components under reduced pressure: 8 parts of vinyltrimethoxysilane; 2 parts of titanium diisopropoxy-bis (ethylacetoacetate); and 1 part of 3-glycydoxypropyl-trimethoxysilane. Thus there was obtained the desired composition.

Comparative Example 1

The same procedure as in Example 1 was repeated to prepare the composition except that 1 part of the α,ω-di-(3-[methylbis[(1-methylethenyl)oxy]]silyl)propyl-poly[oxy(methyl-1,2-ethanediyl)] having a viscosity of 3,000 mPa·s was excluded.

Comparative Example 2

The same procedure as in Example 1 was repeated to prepare the composition except that 1 part of the α,ω-di-(3-[methylbis[(1-methylethenyl)oxy]]silyl)propyl-poly[oxy(methyl-1,2-ethanediyl)] having a viscosity of 3,000 mPa·s was replaced by 1 part of polypropyleneglycol diallyl ether.

Comparative Example 3

The same procedure as in Example 1 was repeated to prepare the composition except that the amount of the α,ω-di-(3-[methylbis[(1-methylethenyl)oxy]]silyl)propyl-poly[oxy(methyl-1,2-ethanediyl)] having a viscosity of 3,000 mPa·s was changed from 1 part to 0.1 parts.

Comparative Example 4

The following two components were uniformly mixed together at 150° C. for 2 hours under reduced pressure: 10 parts of α,ω-dihydroxy-dimethylpolysiloxane having a viscosity of 1,500 mPa·s; and 10 parts of fumed silica having a specific surface area of 130 m²/g. The resulting mixture was further mixed uniformly under reduced pressure with the following three components: 1 part of α,ω-di-(3-[methyl-bis[(1-methylethenyl)oxy]]silyl)propyl-poly[oxy(methyl-1,2-ethanediyl)] having a viscosity of 3,000 mPa·s; 10 parts of vinyltris(methylethylketoxime)silane; and 1 part of γ-aminopropyltriethoxysilane. Thus there was obtained the desired composition.

Comparative Example 5

The same procedure as in Example 5 was repeated to prepare the composition except that the α,ω-di-(3-[methylbis[(1-methylethenyl)oxy]]silyl)propyl-poly[oxy(methyl-1,2-ethanediyl)] having a viscosity of 3,000 mPa·s was excluded.

Comparative Example 6

The same procedure as in Example 6 was repeated to prepare the composition except that the α,ω-di-(3-[methylbis[(1-methylethenyl)oxy]]silyl)propyl-poly[oxy(methyl-1,2-ethanediyl)] having a viscosity of 3,000 mPa·s was excluded.

[Test for Performance]

The samples of the foregoing compositions were tested for performance in the following manner.

Test Methods (A) Physical Properties Before Curing:

Each sample was tested for viscosity by using a rotational viscometer. Each sample was also examined for tack free time according to JIS A1439.

(B) Physical Properties After Curing:

Each sample was formed into a 2-mm thick sheet, which was subsequently cured at 23° C. and 50% RH for 7 days. The cured sheet was tested for rubbery properties according to JIS K6249.

(C) Sagging Properties:

Each sample (60 g) was mixed with xylene (40 g). The resulting mixture was applied to a substrate to form a coating film (250 μm thick) by using a sag tester. The substrate was immediately allowed to stand vertical, and sagging was evaluated according to JIS K5551, Appendix 2.
Pass: No sagging occurs.
Fail: Sagging occurs.

(D) Workability:

Each sample (90 g) was mixed with xylene (10 g). The resulting mixture was applied by airless spraying to a mild steel plate (100×100×1 mm) bonded to a tin plate (1000× 1000×1 mm) which was held vertical. The spray gun was visually checked for clogging, and the critical coating thickness that suffered sagging was measured after drying.

(E) Antifouling Properties:

Each sample was applied to a substrate such that the coating film was 300 μm thick after drying. The substrate is a plate with a previously formed coating film (200 μm thick) of epoxy anti-corrosive paint. The coating film of each sample was cured at 23° C. and 50% RH for 7 days. The cured specimen was suspended in sea water (1.5-meter deep) off Kanagawa beach. After 24 months, it was examined for shells such as barnacles and marine algae sticking to it.

(F) Stability:

Each sample of the coating material was allowed to stand in a closed can at 30° C. for 6 months. After opening, it was visually examined for stability and tested by using a fineness gauge. Workability was evaluated in the same way as mentioned above. The results of the tests are shown in Tables 1 to 3.

TABLE 2

|  |  | Example | |
| --- | --- | --- | --- |
|  |  | 7 | 8 |
| Physical properties before curing | Tack free (min) | 10 | 25 |
|  | Viscosity (Pa·s) | 50 | 120 |
| Physical properties after curing | Hardness, Type-A | 41 | 32 |
|  | Elongation (%) | 200 | 300 |
|  | Tensile strength (MPa) | 1.8 | 1.6 |
| Sagging properties |  | pass | pass |
| Painting workability | Sprayability | good | good |
|  | Critical film thickness (μm) | 200 | 200 |
| Antifouling properties | 3 months | no sticking | no sticking |
|  | 6 months | no sticking | no sticking |
|  | 12 months | little sticking | little sticking |
|  | 24 months | much sticking | much sticking |
| Stability | State of paint | good | good |
|  | Sprayability | good | good |
|  | Critical film thickness (mm) | 200 | 200 |

TABLE 1

|  |  | Example | | | | | |
| --- | --- | --- | --- | --- | --- | --- | --- |
|  |  | 1 | 2 | 3 | 4 | 5 | 6 |
| Physical properties before curing | Tack free (min) | 18 | 8 | 12 | 22 | 24 | 24 |
|  | Viscosity (Pa·s) | 60 | 190 | 150 | 23 | 20 | 22 |
| Physical properties after curing | Hardness, Type-A | 40 | 48 | 45 | 38 | 25 | 24 |
|  | Elongation (%) | 210 | 200 | 210 | 200 | 250 | 230 |
|  | Tensile strength (MPa) | 1.9 | 2.5 | 2.2 | 1.6 | 1.2 | 1.1 |
| Sagging properties |  | pass | pass | pass | pass | pass | pass |
| Painting workability | Sprayability | good | good | good | good | good | good |
|  | Critical film thickness (μm) | 200 | 200 | 200 | 200 | 150 | 150 |
| Antifouling properties | 3 months | no sticking | no sticking | no sticking | no sticking | no sticking | no sticking |
|  | 6 months | no sticking | little sticking | little sticking | no sticking | no sticking | no sticking |
|  | 12 months | little sticking | little sticking | little sticking | little sticking | no sticking | no sticking |
|  | 24 months | much sticking | much sticking | much sticking | much sticking | no sticking | no sticking |
| Stability | State of paint | good | good | good | good | good | good |
|  | Sprayability | good | good | good | good | good | good |
|  | Critical film thickness (mm) | 200 | 200 | 200 | 200 | 150 | 150 |

TABLE 3

|  |  | Comparative Example | | | | | |
|---|---|---|---|---|---|---|---|
|  |  | 1 | 2 | 3 | 4 | 5 | 6 |
| Physical properties before curing | Tack free (min) | 20 | 20 | 20 | 20 | 25 | 25 |
|  | Viscosity (Pa·s) | 50 | 52 | 52 | 52 | 18 | 20 |
| Physical properties after curing | Hardness, Type-A | 38 | 36 | 36 | 39 | 24 | 24 |
|  | Elongation (%) | 220 | 200 | 180 | 200 | 260 | 220 |
|  | Tensile strength (MPa) | 1.8 | 1.6 | 1.6 | 1.7 | 1.0 | 1.1 |
| Sagging properties |  | fail | fail | fail | fail | fail | fail |
| Painting workability | Sprayability | good | good | good | good | good | good |
|  | Critical film thickness (μm) | 50 | 75 | 50 | 50 | smaller than 50 | smaller than 50 |
| Antifouling properties | 3 months | no sticking | no sticking | no sticking | no sticking | no sticking | no sticking |
|  | 6 months | no sticking | no sticking | no sticking | no sticking | no sticking | no sticking |
|  | 12 months | little sticking | little sticking | little sticking | little sticking | no sticking | no sticking |
|  | 24 months | much sticking | much sticking | much sticking | much sticking | no sticking | no sticking |
| Stability | State of paint | good | good | good | good | good | good |
|  | Sprayability | good | good | good | good | good | good |
|  | Critical film thickness (mm) | 50 | 75 | 50 | 50 | smaller than 50 | smaller than 50 |

Japanese Patent Application No. 2008-234605 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A process for producing a room temperature vulcanizable organopolysiloxane composition, comprising:
   hot-mixing a component (A), a component (B) and a component (C) together to obtain a mixture; and
   subsequently mixing a component (D) with the mixture, wherein:
   the component (A) is 100 parts by weight of a diorganopolysiloxane having in one molecule at least two hydroxyl groups and/or hydrolyzable groups connecting to silicon atoms;
   the component (B) is 0.2 to 10 parts by weight of an alkylene oxide compound having silicon atoms in a molecule;
   the component (C) is 0.5 to 100 parts by weight of a silica;
   the component (D) is 0.5 to 30 parts by weight of a silane and/or condensate of partial hydrolyzate thereof; and
   the alkylene oxide compound for the component (B) is one selected from the group consisting of compounds represented by the following formulas:

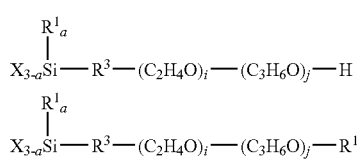

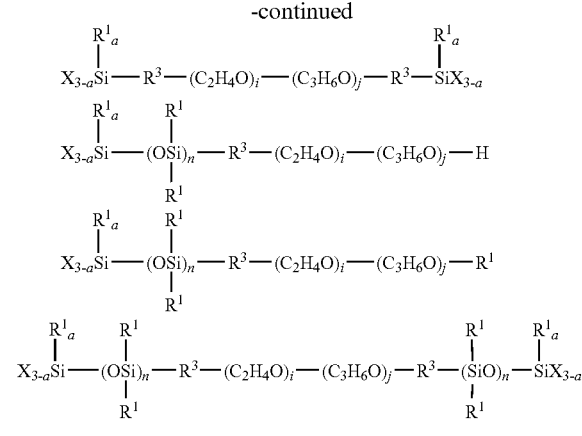

where $R^1$ independently denotes a substituted or unsubstituted monovalent hydrocarbon group having 1 to 6 carbon atoms, $R^3$ denotes an alkylene group having 1 to 12 carbon atoms, X independently denotes a hydrolyzable group, "a" denotes an integer of 0 to 3, n denotes an integer of 1 to 30, and i and j each denote an integer of 0 or more, with i+j being at least 3.

2. The process as defined in claim 1, wherein the component (C) is hydrophilic silica.

3. The process as defined in claim 1, further comprising adding bleed oil after hot-mixing of the components (A), (B), and (C).

4. A base material coated with a cured product of the composition obtained by the process defined in claim 1.

5. The base material as defined in claim 4, which is an underwater structure.

6. The process as defined in claim 1, wherein the hot-mixing comprises:
   hot-mixing the component (A) and the component (B) to obtain a first mixture; and
   hot-mixing the component (C) with the first mixture.

7. The process as defined in claim 1, wherein the hot-mixing is performed at normal pressure or under reduced pressure with heating for 0.5 to 3 hours.

8. The process as defined in claim 1, wherein the hot-mixing is performed at a temperature of 80° C. to 300° C.

9. The process as defined in claim 1, wherein the silica has a BET specific surface area of at least 10 m²/g.

10. The process as defined in claim 1, wherein the component (D) is represented by a formula:

$$R^4_b SiX_{4-b}$$

where $R^4$ independently denotes a substituted or unsubstituted monovalent hydrocarbon group having 1 to 6 atoms, X independently denotes a hydrolysable group, and b is an integer of 0 to 2.

11. The process as defined in claim 10, wherein X in the formula is one of an alkoxyl group, a ketoxime group, and an isopropenoxy group.

12. The process as defined in claim 3, wherein the adding is performed at a temperature no higher than 80° C.

13. The process as defined in claim 3, wherein the bleed oil is added to the mixture at the time of mixing the component (D).

* * * * *